United States Patent [19]

Troutner

[11] Patent Number: 4,798,362
[45] Date of Patent: Jan. 17, 1989

[54] ADJUSTABLE CROSSARM SPACER AND UTILITY LINE HANGER APPARATUS

[75] Inventor: Arthur L. Troutner, Boise, Id.

[73] Assignee: Trus Joist Corporation, Boise, Id.

[21] Appl. No.: 561,683

[22] Filed: Dec. 15, 1983

[51] Int. Cl.[4] ............................................. H02G 7/00
[52] U.S. Cl. ...................... 248/62; 248/214; 174/40 R
[58] Field of Search .................. 248/57, 62, 214, 343; 403/167, 43–47; 52/697, 40, 650, 652, 702; 249/177, 42; 174/40 R, 45 R

[56] References Cited

U.S. PATENT DOCUMENTS

| | | | |
|---|---|---|---|
| 1,257,097 | 2/1918 | Morris | 403/167 |
| 1,423,202 | 7/1922 | Fellows | 403/44 |
| 2,045,150 | 6/1936 | Kenneally | 189/33 |
| 2,516,271 | 7/1950 | Taylor | 248/226 |
| 2,708,686 | 5/1955 | Bernard et al. | 174/41 |
| 2,721,362 | 10/1955 | McCoy et al. | 20/99 |
| 2,889,595 | 6/1959 | Jeckell | 52/650 |
| 2,985,417 | 5/1961 | Thompson | 248/214 |
| 3,428,283 | 2/1969 | Dake | 248/214 |
| 3,445,582 | 5/1969 | Herrenkohl et al. | 174/43 |
| 3,462,907 | 8/1969 | McKean | 52/40 |
| 3,948,475 | 9/1974 | Jones | 248/226 |
| 4,167,260 | 9/1979 | Hahin | 248/225.3 |

FOREIGN PATENT DOCUMENTS 570140 12/1975 Switzerland ...................... 248/214

OTHER PUBLICATIONS

Hughes Brothers Catalog pp. 15 and 17 on Adjustable Spacer Fittings, published 1967.
Hubbard & Co. drawing No. 5840-33 entitled Adjustable Spacer Fitting, dated Aug. 29, 1975.

Primary Examiner—Alvin C. Chin-Shue
Assistant Examiner—Robert A. Olson
Attorney, Agent, or Firm—Klarquist, Sparkman, Campbell, Leigh & Whinston

[57] ABSTRACT

An adjustable spacer and hanger apparatus is described which may be used to adjust the spacing between two utility pole crossarms and to support an electrical utility line on such crossarms. The adjustable spacer and hanger apparatus includes a pair of bracket members attached to a pair of spaced elongated support members such as utility pole crossarms. Each bracket member includes a threaded stud connector which engages the opposite ends of a rotatable hanger member positioned between such pair of bracket members. The spacing between the bracket members and the support members or crossarms is adjusted by rotation of the hanger member about the threaded connectors. The hanger member is provided with an aperture or fastening ring for attachment to the element being supported, such as one end of an insulator stack supporting an electrical utility line.

20 Claims, 2 Drawing Sheets

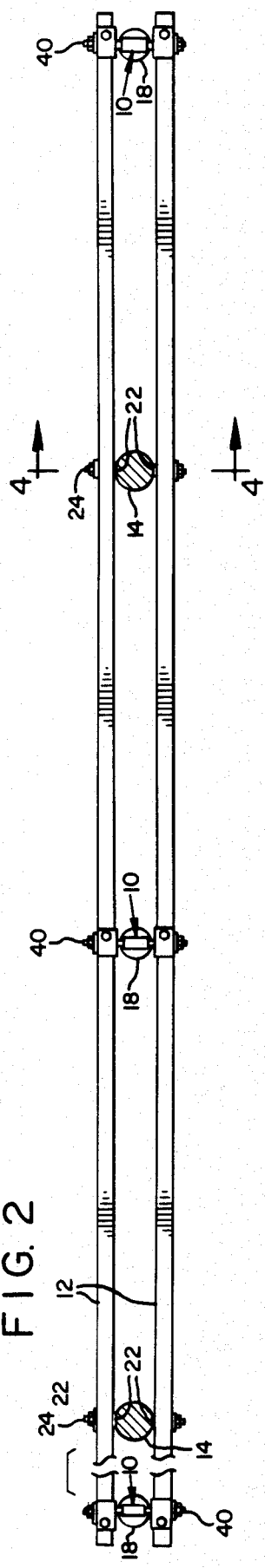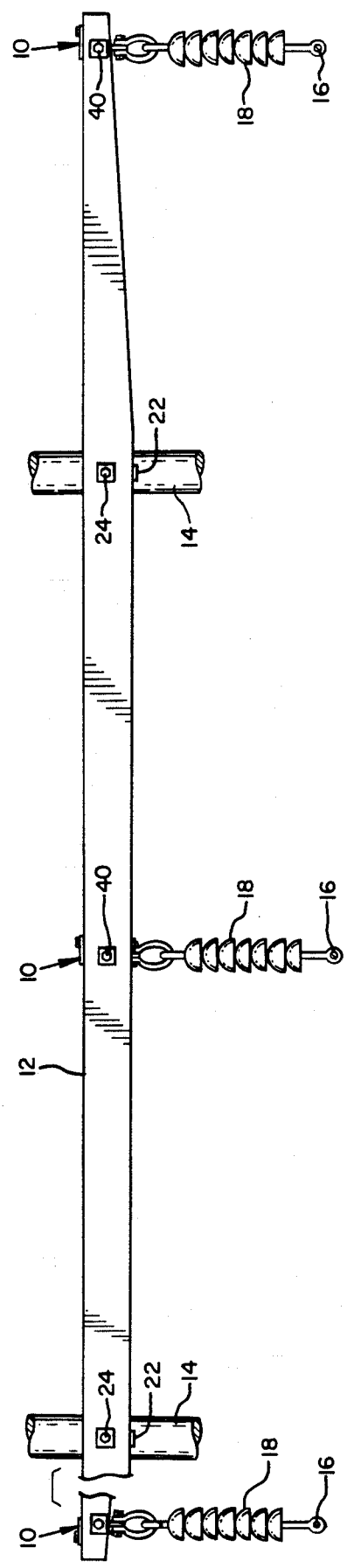

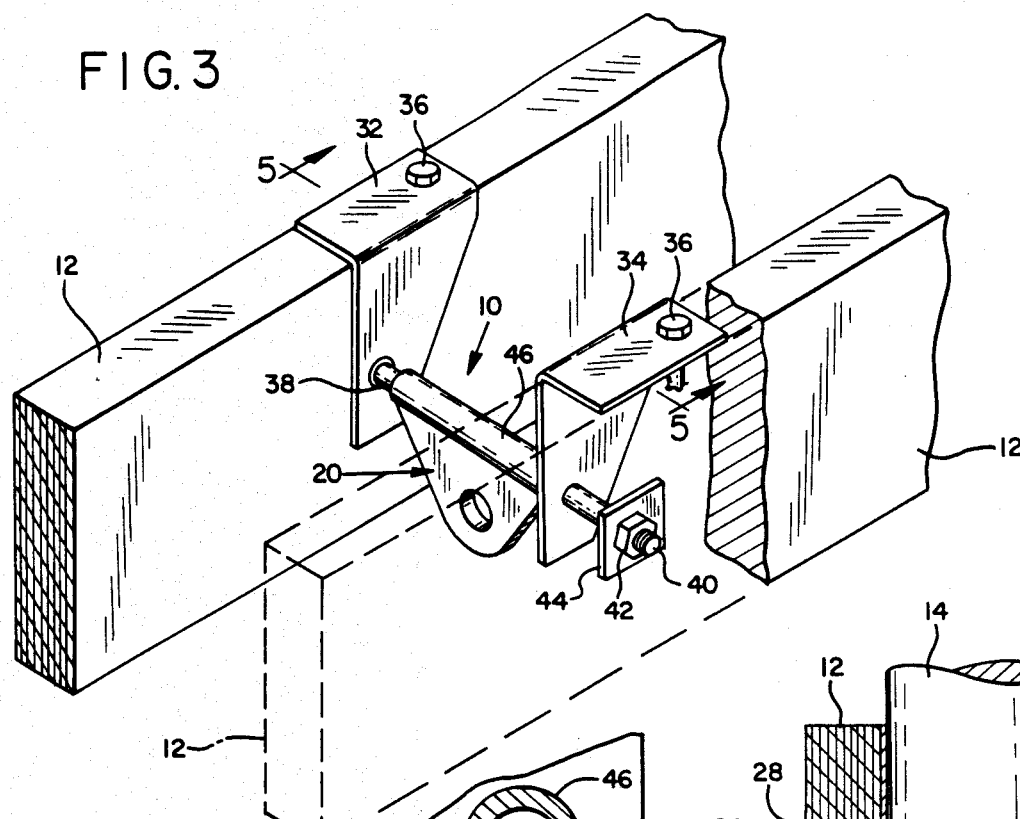
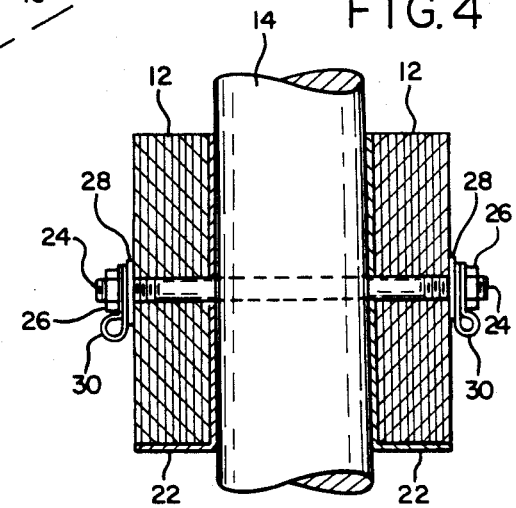
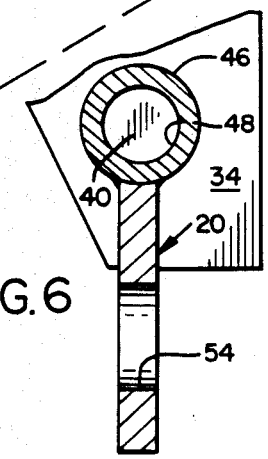
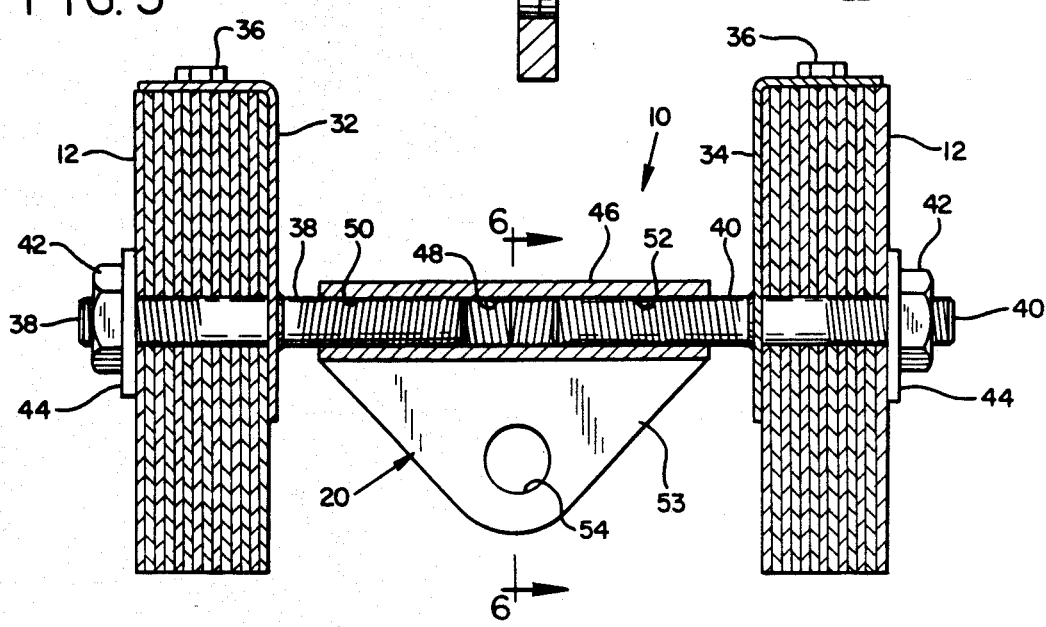

ADJUSTABLE CROSSARM SPACER AND UTILITY LINE HANGER APPARATUS

BACKGROUND OF THE INVENTION

The subject matter of the present invention relates generally to adjustable spacer and hanger apparatus for adjusting the spacing between two spaced support members and for supporting an element hanging from such support members. More specifically, the present invention relates to an adjustable spacer for utility pole crossarm members and hanger for an electrical utility line, including a rotatable hanger member and a pair of bracket members having threaded connectors engaging the opposite ends of such hanger member in order to adjust the spacing between the crossarms by rotation of the hanger member.

The adjustable spacer and hanger apparatus of the present invention is especially useful in supporting electrical power transmission lines by attachment to electrical utility pole crossarm members to vary the spacing between such crossarm members in order to accommodate different pole diameters. Electrical utility poles of wood are frequently of different diameters and the diameter of each pole varies usually from a large diameter at its bottom end to a smaller diameter at its top end. Frequently, the diameters of the poles at the position above the ground where the crossarms are to be fastened is not determined until a workman in the field attempts to fasten the crossarms to the pole. Thus, the spacing between the crossarm must frequently be adjusted by the workman while he is working on the utility pole many feet above the ground. The adjustable spacer and hanger apparatus of the present invention enables rapid adjustment of the spacing between the crossarms in a simple manner merely by rotating the hanger member about the threaded connectors extending from the pair of bracket members fastened to such crossarms.

Previously it has been proposed in U.S. Pat. No. 3,428,283 of Dake issued Feb. 18, 1969 to provide an adjustable crossarm spacer and transmission line hanger assembly in the form of a pair of longitudinally sliding spacer members. The spacer members are nested together, but are provided with elongated holes and bolts therethrough to enable longitudinal sliding adjustment of the spacer members to adjust the spacing between the crossarm members fastened thereto. Unlike the present invention, this adjustable spacer and hanger apparatus is much more complicated and its attachment is more time consuming in that it requires the adjustment of from three to five nut and bolt assemblies to adjust the spacing of each spacer apparatus. In addition, such prior adjustable spacer and hanger apparatus is more expensive than that of the present invention. Also, due to the use of adjustment bolts which are susceptible of loosening during use, changes in spacing can result, such as when strong forces due to high winds are applied to the crossarms and spacer apparatus. A similar longitudinally adjustable spacer and hanger apparatus for utility pole crossarms is manufactured by Hughes Brothers, Inc. of Lincoln, Neb. However, the two longitudinal sliding adjustable spacer members of Hughes are provided with a plurality of circular bolt openings spaced longitudinally there along, rather than an elongated slot, for each bolt to provide for longitudinal adjustment of the spacer apparatus. Nevertheless, Hughes employs four nut and bolt assemblies to provide for such adjustment, and is subject to many of the same disadvantages as those of the previously discussed Dake patent.

The adjustable spacer and hanger apparatus of the present invention has several advantages including easier assembly in the field and faster adjustment of the spacing between crossarm members on the utility pole by rotation of the hanger member. Such spacer and hanger apparatus is simpler and less expensive than the prior apparatus, but carries the same load. In addition to adjusting the spacing between the crossarm members to accommodate different pole diameters, the spacer and hanger apparatus prevents twisting of the crossarm members about their longitudinal axis due to the turning force applied thereto by wind blown utility lines supported by the hanger.

SUMMARY OF INVENTION

It is therefore one object of the present invention to provide an improved adjustable spacer and hanger apparatus of simple and economical construction.

Another object of the invention is to provide such an adjustable spacer and hanger apparatus for adjusting the spacing between two support members in a simple and rapid manner merely by rotating a hanger member in such apparatus.

A further object of the invention is to provide such an adjustable spacer and hanger apparatus which is suitable for adjusting the spacing between two utility pole crossarm members and for supporting an electrical utility line by hanging it from such crossarm members.

An additional object of the invention is to provide such an adjustable spacer hanger apparatus which maintains a predetermined spacing between two utility pole crossarm members and which is not susceptible of loosening to vary the spacing between the crossarms during high wind or other adverse operating conditions.

Still another object of the invention is to provide such an adjustable spacer and hanger apparatus which may be adjusted to vary the spacing between crossarm members in order to accommodate different utility pole diameters quickly and easily in the field such as by a workman on the utility pole above the ground.

A still further object of the invention is to provide such an adjustable spacer and hanger apparatus which prevents twisting of the crossarm members about their longitudinal axis due to forces applied thereto by wind blown utility lines supported from the crossarm members on the hanger member.

DESCRIPTION OF DRAWINGS

Other objects and advantages of the present invention will be apparent from the following description of a preferred embodiment thereof and from the attached drawings of which:

FIG. 1 is a side elevation view of an electrical utility line support system using the adjustable spacer and hanger apparatus of the invention for spacing apart two utility pole crossarms and for hanging support of the utility line;

FIG. is a plan view of the support system of FIG. 1;

FIG. 3 is an enlarged oblique view of one of the adjustable space hanger apparatus used in FIGS. 1 and 2;

FIG. 4 is an enlarged vertical section view taken along the line 4—4 of FIG. 2;

FIG. 5 is an enlarged section view taken along the line 5—5 of FIG. 3 with parts broken away for clarity; and FIG. 6 is a vertical section view taken along the line 6—6 of FIG. 5.

DESCRIPTION OF PREFERRED EMBODIMENT

As shown in FIGS. 1 and 2, three adjustable spacer and hanger apparatus 10 in accordance with the present invention are attached between a pair of elongated support members such as utility pole crossarms 12 which are mounted on two utility poles 14. The utility poles may be wooden poles of different diameter which are typically between about 8 and 16 inches in diameter for poles supporting electrical power transmission lines 16 hanging from insulator stacks 18 which are each attached to a hanger member 20 in different ones of such spacer and hanger apparatus.

The crossarm members 12 are supported on the utility poles 14 by two pairs of support brackets 22 of L-shaped cross-section with the horizontal leg portion of the bracket beneath the crossarm member and the vertical leg portion between the crossarm member and the pole. Each pair of brackets has a mounting bolt 24 extending through the crossarms, the mounting brackets 22 and the pole 14, and such bolt is attached thereto by two nuts 26 at its opposite ends as shown in FIG. 4. A square washer 28 and a spring lock washer 30 are provided between each nut 26 and the outer surface of the wood crossarms 12 in order to prevent such nuts from loosening during use. The crossarms 12 may be made of laminated wood veneer to increase the strength and reduce the weight of the crossarms, and may be provided with tapered end portions at the opposite ends of such crossarm. The tapered end portions taper from a maximum width of about 8.9 inches adjacent the utility poles 14 to a minimum width of 3 and 9/16 inches at the outermost end of such crossarms when crossarms are of 28 feet in length. Such 28 foot long crossarms may have a thickness of 2.5 inches when made of laminated wood veneer.

As shown in FIGS. 3 and 5, the adjustable spacer and hanger apparatus 10 includes a pair of mounting bracket members 32 and 34 of an inverted L cross-section positioned on opposite sides of the hanger member 20. The mounting brackets have their horizontal top plate portions fastened to the top edges of the crossarm members 12 by lag bolts 36 or through bolts extending through such crossarms and holes in the top plates of the mounting brackets, such through bolts being secured to nuts and washers (not shown) on the bottom of the crossarms. The mounting brackets 32 and 34 are provided with externally threaded stud connectors 38 and 40, respectively, extending through and welded to vertical side plate portions of the mounting bracket. The inner ends of the stud connectors 38 and 40 are threaded into internally threaded apertures at the opposite ends of the hanger member 20. The outer ends of the threaded studs 38 and 40 extend outwardly from the vertical side plates of the brackets 32 and 34 through the crossarm members 12 and are secured thereto by nuts 42 and square washers 44.

As shown in FIGS. 5 and 6, the hanger member 20 is provided with a cylindrical pivot portion 46 and a threaded pivot passageway 48 extending the entire length of such pivot portion. The passageway is divided in half to form a left end passage 50 and a right end passage 52 of opposite threads for receipt of the threaded ends of the studs 38 and 40, respectively. The right end half 52 of the threaded central portion of passageway 48 may be provided with right handed threads to accommodate the threaded end of stud 40 while the left end half 50 of the threaded portion of passageway 48 may be provided with left handed threads to accommodate the threads of the stud 38. As a result, when the hanger member 20 is rotated in a clockwise or counterclockwise direction about an axis 53 of rotation corresponding to the axis of pivot passageway 48, the threaded studs 38 and 40 and the brackets 32 and 34, respectively, attached thereto will be caused to be moved toward or away from each other depending upon the direction of rotation. Thus, rotation of the hanger member 20 varies the spacing between such brackets as well as the spacing between the two crossarm members 12 attached thereto.

In one example, the pivot portion 46 of hanger member 20 has a length of 8.0 inches and an outer diameter of 1.500 inch, while the threaded passageway 48 has a length of eight inches and an inner diameter of 1.000 inch so it mates with the studs 38 and 40 each of 4.0 inches long and 1.000 inch diameter. Thus, the right hand threaded half 52 of passageway 48 is four inches long and the left hand threaded half 50 is also four inches long. This provides a total adjustment of approximately four inches in the spacing between the brackets 32 and 34 and their corresponding crossarm members 12. In this example, the threaded studs 38 and 40 are nine inches long and are each provided with two threaded end portions three inches long so that the spacing between the crossarms 12 may be adjusted between 8 and 12 inches to accommodate pole diameters of this size range.

The hanger member 20 includes a flat hanger plate portion 53 of ⅜ inch thickness having a hanger aperture 54 provided therein of approximately 1.375 inch diameter. The hanger aperture is used for securing the hanger member to the top of the insulator stack 18 in order to support the transmission line 16 secured to the bottom of such stack by hanging such transmission line from the crossarm members 12. It should be noted that considerable twisting force is applied to the crossarm members 12 by the transmission lines 16 in a wind storm which tends to twist such crossarms about their longitudinal axis. This twisting which can break the crossarms, is prevented by the adjustable spacer and hanger apparatus 10 which maintains the crossarms substantially parallel.

It will be obvious to those having ordinary skill in the art that many changes may be made in the preferred embodiment of the invention as described above. Therefore, the scope of the invention should be determined by the following claims.

I claim:

1. Adjustable spacer and hanger apparatus for supporting an electrical utility line, comprising:

a pair of bracket members adapted for attachment to a pair of spaced elongated support members, each bracket member including a bracket plate and a threaded connector provided on said plate;

fastening means for attaching said bracket members to said support member;

rotatable hanger means for supporting the electrical utility line on said support members; and adjustable connector means for connecting said hanger means to the two threaded connectors on said pair of bracket members so that the spacing between said bracket members can be adjusted by rotation of said hanger means about an axis of rotation to accommodate changes in the spacing between the pair of support members.

2. Apparatus in accordance with claim 1 in which the two threaded connectors are in alignment with the axis of rotation of said hanger means.

3. Apparatus in accordance with claim 2 in which the threaded connectors on said bracket members are threaded studs, and the adjustable connector means is a threaded passageway means having two openings in the opposite ends of a hanger member providing said hanger means, said passageway means threadedly engaging said studs so that rotation of said hanger member adjusts the spacing between said bracket members.

4. Apparatus in accordance with claim 3 in which the bracket members include a threaded fastener attached to each of the bracket plates on the opposite side from said stud to provide said fastening means for attachment of the bracket members to the support members.

5. Apparatus in accordance with claim 4 in which the threaded fasteners are in axial alignment with said studs.

6. Apparatus in accordance with claim 1 in which the bracket members also include a flange extending substantially perpendicular to said bracket plate to provide an L-shaped bracket member.

7. Apparatus in accordance with claim 6 in which a hole is provided in said flange for fastening said bracket member to said support member.

8. Apparatus in accordance with claim 1 in which the hanger means is a hanger member including a pivot sleeve about which the hanger member rotates and including a hanger plate which extends laterally from one side of said sleeve, said hanger plate having an aperture for supporting said element.

9. Apparatus in accordance with claim 8 in which the pivot sleeve includes a threaded passageway therethrough including two opposite end passage portions having threads of opposite direction, said threaded connectors on said bracket members being studs which threadedly engage the end passage portion of the pivot sleeve.

10. Apparatus in accordance with claim 1 in which the support members are utility pole crossarm members and the hanger means is for supporting an electrical utility line.

11. An electrical utility line support apparatus, comprising:
a pair of utility pole crossarm members;
a pair of bracket members adapted for attachment to said crossarm members, each bracket member including a bracket plate and a threaded connector provided on said plate;
fastening means for attaching said bracket members to said crossarm members so that the threaded connectors on said bracket members are positioned between said crossarm members;
rotatable hanger means for supporting said utility line; and
adjustable connector means for connecting said hanger means to the two threaded connectors on said pair of bracket members so that the spacing between said bracket members can be adjusted by rotation of said hanger means about an axis of rotation to accommodate changes in the spacing between the pair crosssarm members.

12. Apparatus in accordance with claim 11 in which the two threaded connectors are in alignment with the axis of rotation of said hanger means.

13. Apparatus in accordance with claim 12 in which the threaded connectors on said bracket members are threaded studs, and the adjustable connector means is a threaded passageway means having two openings in the opposite ends of a hanger member providing said hanger means, said passageway means threadedly engaging said studs so that rotation of said hanger member adjusts the spacing between said bracket members.

14. Apparatus in accordance with claim 13 in which the bracket members include a threaded fastener attached to each of the bracket plates on the opposite side from said stud to provide said fastening means for attachment of the bracket members to the crossarm members.

15. Apparatus in accordance with claim 14 in which the threaded fasteners are in axial alignment with said studs.

16. Apparatus in accordance with claim 11 in which the bracket members also include a flange extending substantially perpendicular to said bracket plate to provide an L-shaped bracket member.

17. Apparatus in accordance with claim 16 in which a hole is provided in said flange and fastener means extending through said hole for fastening said bracket member to said crossarm member with said flange engaging the top of said crossarm member.

18. Apparatus in accordance with claim 11 in which the hanger means is a hanger member including a pivot sleeve about which the hanger member rotates and including a hanger plate which extends laterally from one side of said sleeve, said hanger plate having an aperture for supporting the utility line.

19. Apparatus in accordance with claim 18 in which the pivot sleeve includes a threaded passageway therethrough divided into two opposite end passage portions, having threads of opposite direction, said threaded connectors on said bracket members being studs which threadedly engage the end passage portions of the pivot sleeve.

20. Apparatus in accordance with claim 11 in which the crossarm members are of laminated wood veneer.

* * * * *

UNITED STATES PATENT AND TRADEMARK OFFICE
CERTIFICATE OF CORRECTION

PATENT NO. : 4,798,362

DATED : January 17, 1989

INVENTOR(S) : Arthur L. Troutner

It is certified that error appears in the above-identified patent and that said Letters Patent is hereby corrected as shown below:

In the Specification:
Column 2, line 63, insert the number --2-- after the word "FIG.".
Column 2, line 65, "space" should be --spacer-- and insert the word --and-- between the words "spacer" and "hanger".

Signed and Sealed this

Fifth Day of June, 1990

*Attest:*

HARRY F. MANBECK, JR.

*Attesting Officer*     *Commissioner of Patents and Trademarks*